Figure 1:
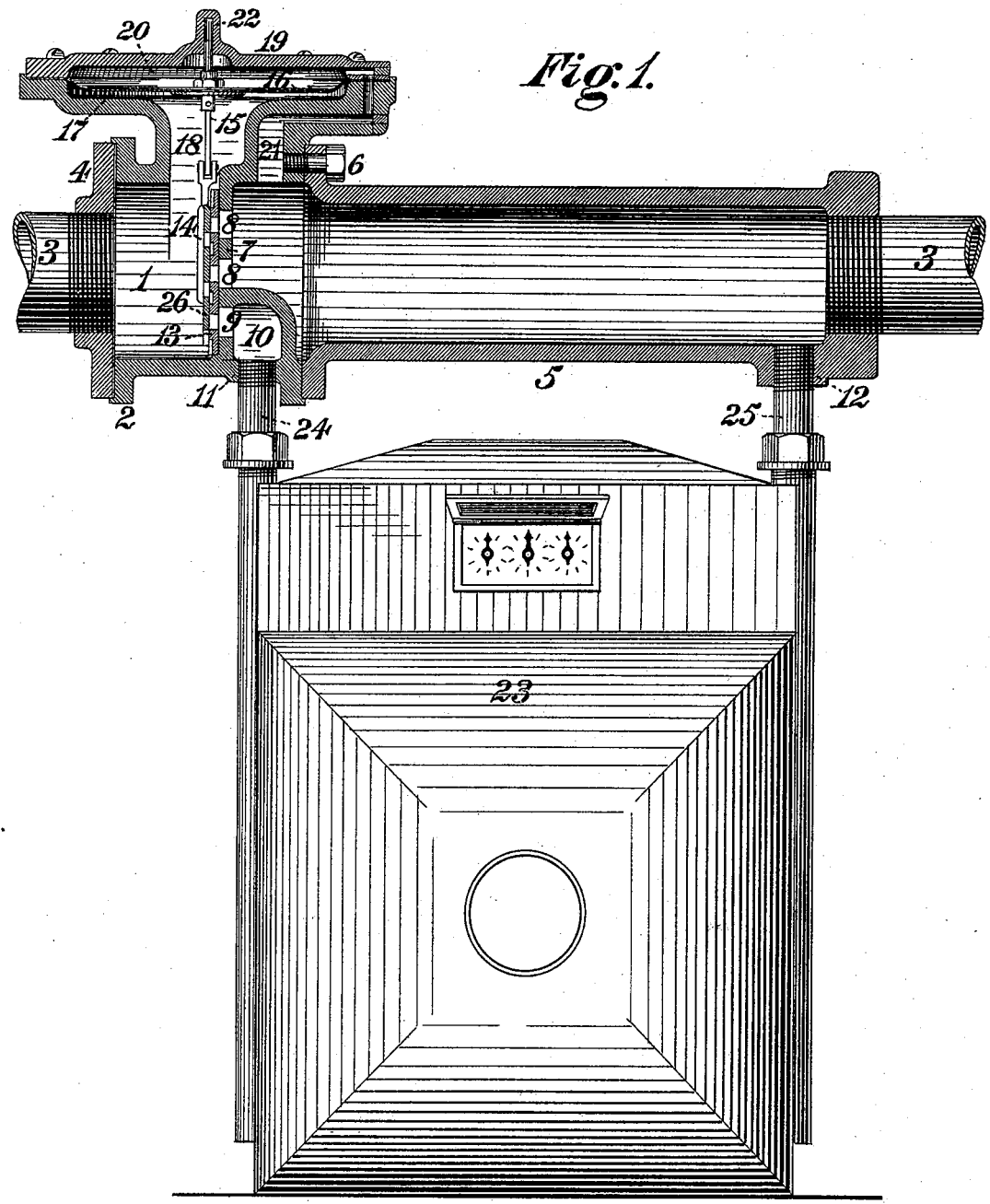

(No Model.) 2 Sheets—Sheet 1.

F. MOORE.
PRESSURE REGULATOR FOR PROPORTIONAL GAS METERS.

No. 340,450. Patented Apr. 20, 1886.

WITNESSES:
Snowden Bell.
C. M. Clarke

INVENTOR,
Frank Moore
George H. Christy Att'y.

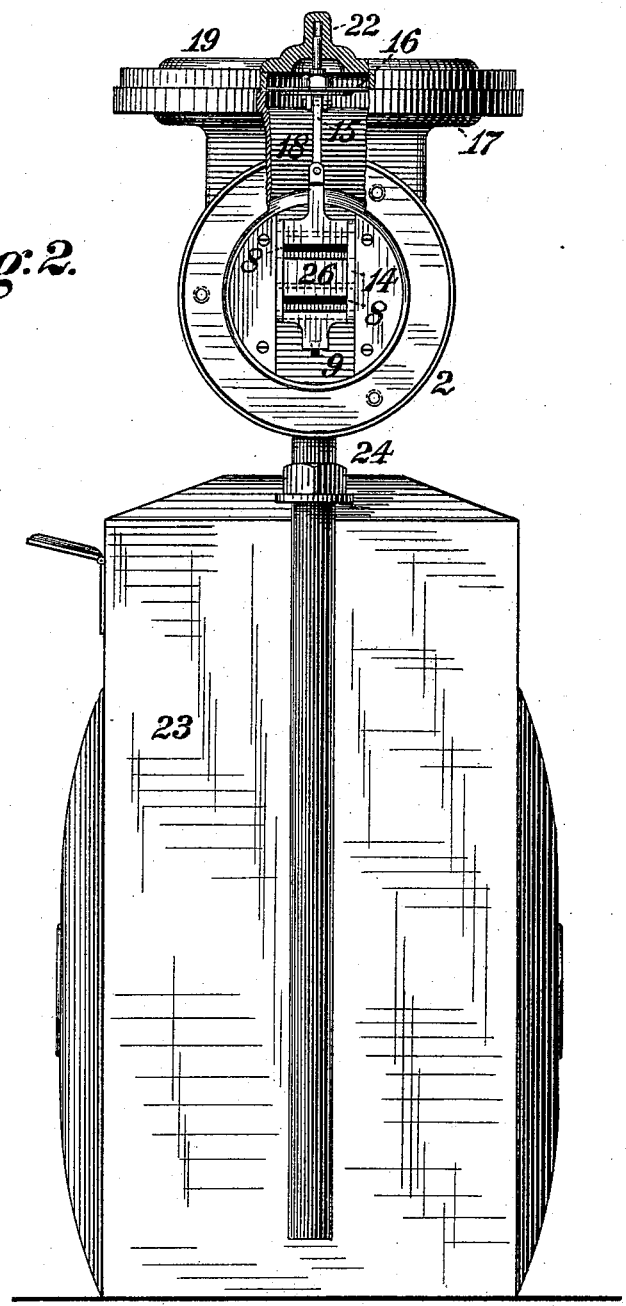

UNITED STATES PATENT OFFICE.

FRANK MOORE, OF PITTSBURG, PENNSYLVANIA.

PRESSURE-REGULATOR FOR PROPORTIONAL GAS-METERS.

SPECIFICATION forming part of Letters Patent No. 340,450, dated April 20, 1886.

Application filed January 23, 1886. Serial No. 189,443. (No model.)

*To all whom it may concern:*

Be it known that I, FRANK MOORE, residing at Pittsburg, in the county of Allegheny and State of Pennsylvania, a citizen of the United States, have invented or discovered a certain new and useful Improvement in Pressure-Regulators for Gas-Meters, of which improvement the following is a specification.

In the accompanying drawings, which make part of this specification, Figure 1 is a longitudinal central section through a regulator embodying my invention with the meter in elevation; and Fig. 2, an end view, partly in section, of the same.

In cases where the supply of gas which it is desired to measure is comparatively large in quantity it has been heretofore proposed, for the purpose of avoiding the necessity of using such large and expensive meters as would under ordinary conditions be required to afford the requisite measuring capacity, to deliver a small determined fraction of the supply to a meter of correspondingly-reduced capacity and compute therefrom the total volume of supply as a known multiple of that passing through the meter.

It is the object of my invention to render such system of measurement desirably and effectively practicable by providing means for insuring the passage of the required proportion of the supply of gas into and out of the meter through an automatic reduction and regulation of pressure, which maintains a constant difference of pressure between the receiving and delivery sides of the meter sufficient to overcome the frictional resistance thereof.

To this end my invention, generally stated, consists in the combination, with a gas-supply pipe, of a valve-chest, a regulating-valve governing a series of ports or openings in a transverse plate or partition therein, one or more of said openings, of determined fractional portion of the entire area, communicating with a meter-supply opening or passage communicating with the valve-chest on the delivery-side of the valve-opening partitions.

The improvement claimed is hereinafter fully set forth.

In the practice of my invention I provide a valve chest or casing, 1, having an end flange or nozzle, 2, adapted to be connected to a gas-supply pipe, 3, either directly or through a flange or coupling, 4, on the pipe. The valve-chest is interposed in and constitutes part of the length of the gas-supply pipe 3, its opposite open end being connected to the adjacent section of said pipe, preferably as shown, through a cylindrical extension, 5, cast separately from the main body of the chest and secured thereto by bolts 6.

A plate or partition, 7, extends across the valve-chest, and a series of ports or openings, 8 9, are formed in said partition, the ports 8 establishing direct communication between the supply end of the chest, which is connected directly to the gas-supply pipe 3, and the delivery end thereof, which terminates the extension 5 of the chest.

The ratio of the effective area of the port 9, which may be termed a "meter-port," to the combined effective areas of the direct delivery-ports 8 is such as will be proper to afford a delivery through the port 9 of the desired fractional portion of the volume of gas passing into the supply end of the valve-chest which is to be supplied to the meter, and said port establishes communication between the supply end of the chest and a meter-supply channel or passage, 10, terminating in a nozzle, or opening, 11, in the wall of the chest. A meter-delivery opening or nozzle, 12, of substantially corresponding diameter to that of the supply-opening 11, is formed in the valve-chest or the extension thereof adjacent to its delivery-end. A valve-face, 13, having a truly plane surface and a series of ports which are cut accurately in correspondence with the desired effective areas of the ports 8 and 9, is preferably secured upon the supply side of the partition 7, and the ports 8 in the partition and valve-face are located at right angles to the port 9—that is to say, horizontally—while the port 9 is vertical, so that a correspondingly greater fractional area of the ports 8 than of the port 9 will be uncovered under different degrees of traverse of a valve governing said ports.

A regulating-valve, 26, having a series of bars and intermediate ports, adapted to wholly or partially close the ports 8 and 9 and the corresponding valve-face ports, is fitted to traverse between guides 14 on the valve-face, said valve being coupled to the central stem, 15, of a flexible diaphragm or movable abutment, 16, which is fixed at its periphery to the wall of a pressure-chamber, 17, communicating by a passage, 18, with the supply end of the valve-chest 1. The diaphragm 16 is fitted closely, so as to make a gas-tight joint between a circumferential flange on the pressure-chamber 17 and a lid or cap, 19, which closes the top of the chamber and incloses a space, 20, therein, above the diaphragm, which space communicates with the valve-chest on the delivery side of the partition 7 by a passage, 21. The upper end of the diaphragm 16 may be guided by fitting in a central socket, 22, in the lid. The gravity of the valve, diaphragm, and stem, acting downwardly, tends to close the ports 8 and 9, such tendency being opposed by the pressure of the gas upon the lower side of the diaphragm. In the larger sizes of regulators the normal action of the diaphragm is insured by a counter-weight of sufficient gravity to counterbalance to the required degree the weight of the regulating-valve and its connections.

A registering gas meter, 23, of any suitable and preferred construction and of sufficient capacity to effect the measurement of the volume of gas passing through the meter-port 9, is connected by a supply-pipe, 24, to the meter-supply opening 11, and by a delivery-pipe, 25, to the outer delivery-opening, 12, through which the smaller volume of gas, which is supplied to and measured by the the meter, passes to the delivery end of the valve-chest extension, and is discharged therefrom, together with the larger volume of gas passing through the direct delivery-ports 8.

In operation the pressure of the gas which enters the supply end of the valve-chest, acting through the passage 18 on the lower side of the diaphragm 16, raises the diaphragm and regulating-valve and opens the ports 8 and 9, the pressure of the gas which passes through the direct delivery-ports 8 acting in the space 20 upon the upper side of the diaphragm and limiting the elevation of the regulating-valve to such degree as will suffice to effect the desired and determined difference of pressure between the supply and delivery sides of the valve-chest partition 7, such difference being slightly greater than the pressure required to overcome the frictional resistance of the measuring and registering mechanism of the meter 23. Variations of supply-pressure will correspondingly vary the degree of opening of the ports without interfering with the maintenance of such ratio of differential pressure, so that, there being always a preponderance of supply-pressure over resistance in the meter, the flow of the determined fraction of the volume of gas-supply through the same is assured under all conditions of supply, such automatic regulation counteracting the tendency which would otherwise exist, and at low pressure be completely exerted by reason of the frictional resistance of the meter, for the entire volume of gas to pass through the direct delivery-ports 8, with a consequent failure of operation of the meter.

I claim herein as my invention—

1. The combination of a gas-supply pipe, a series of direct delivery-ports, and a meter port or ports whose area is a determined fraction of the combined areas of the direct delivery-ports, the direct delivery-ports and meter-ports each communicating with the supply-pipe, a regulating-valve governing the flow of gas through all of said ports, an independent pressure-regulator coupled to said regulating-valve, and a gas-meter adapted to receive a supply of gas from the meter port or ports and to deliver the same to a passage communicating with the discharge end of the direct delivery-ports, substantially as set forth.

2. The combination of a gas-supply pipe, a valve-chest interposed in and forming portion of the length thereof, a partition extending transversely in said chest and having a series of ports establishing communication directly between the ends thereof, and a port or ports of determined lesser area establishing communication between the supply end of the chest and a meter-supply passage, a regulating-valve governing communication through all of said ports, a diaphragm coupled to said valve and working in a pressure-chamber communicating with the supply end of the chest on the side of the diaphragm adjacent to the valve, a port or passage establishing communication between the delivery end of the chest and the pressure-chamber on the side of the diphragm farthest from the valve, and a gas-meter having a supply-pipe communicating with the meter-supply passage, and a delivery-pipe communicating with the delivery end of the valve-chest, substantially as set forth.

3. The combination of a valve-chest having a supply-nozzle or flanged opening at one end and a longitudinal extension terminated by a delivery nozzle or opening at the other, each of said end openings being suited for connection to a gas-supply pipe, a transverse partition having a series of ports establishing direct communication between the supply and delivery openings, and a port of determined lesser area establishing communication between the supply-opening and a lateral meter-supply passage leading to an opening in the wall of the chest, a regulating-valve adapted to work over all of said ports, a diaphragm coupled to the regulating-valve and extending across a pressure-chamber communicating with the supply-opening of the chest, a passage establishing communication between the delivery side of the valve-chest and the pressure-chamber on the side of the diaphragm farthest from the valve, and a meter-delivery passage formed in the wall of the longitudinal extension of the valve-chest, substantially as set forth.

In testimony whereof I have hereunto set my hand.

FRANK MOORE.

Witnesses:
J. SNOWDEN BELL,
R. H. WHITTLESEY.